(12) United States Patent
Patel

(10) Patent No.: US 10,660,102 B1
(45) Date of Patent: May 19, 2020

(54) METHOD AND APPARATUS FOR BROADCAST CHANNEL DECODER

(71) Applicant: MBIT WIRELESS, INC., Irvine, CA (US)

(72) Inventor: Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 199 days.

(21) Appl. No.: 15/634,728

(22) Filed: Jun. 27, 2017

(51) Int. Cl.
*H04W 72/04* (2009.01)
*H04L 29/08* (2006.01)
*H04W 72/00* (2009.01)
*H04L 1/18* (2006.01)
*H04W 88/08* (2009.01)

(52) U.S. Cl.
CPC ....... *H04W 72/0466* (2013.01); *H04L 1/1812* (2013.01); *H04L 69/324* (2013.01); *H04W 72/005* (2013.01); *H04W 72/0406* (2013.01); *H04W 72/0446* (2013.01); *H04W 88/08* (2013.01)

(58) Field of Classification Search
CPC .... H03M 13/09; H03M 13/23; H03M 13/413; H03M 13/45; H03M 13/2906; H03M 13/3769; H03M 13/1102; H03M 13/258; H04L 1/0054; H04L 1/0059; H04L 1/0067; H04L 1/0072; H04L 5/001; H04L 5/0053; H04L 5/0094; H04L 27/2656; H04L 27/2673; H04L 1/0061
See application file for complete search history.

(56) References Cited

U.S. PATENT DOCUMENTS

| | | | | |
|---|---|---|---|---|
| 2010/0002808 A1* | 1/2010 | Pons | ................. | H04L 25/03305 375/320 |
| 2011/0255631 A1* | 10/2011 | Pi | ......................... | H03M 13/09 375/295 |
| 2015/0358975 A1* | 12/2015 | Yang | ................... | H04W 72/082 370/336 |
| 2017/0194988 A1* | 7/2017 | Li | ........................ | H03M 13/45 |

* cited by examiner

*Primary Examiner* — Oussama Roudani
(74) *Attorney, Agent, or Firm* — Lerner, David, Littenberg, Krumholz & Mentlik, LLP

(57) ABSTRACT

In wireless communications systems, a client terminal performs cell search procedure to find a suitable cell and camp on it to receive service from the network. In 3GPP LTE wireless communication system, the cell search involves the decoding of the Physical Broadcast Channel (PBCH) which may take relatively long time to decode under poor channel conditions which in turn may affect the time it takes to receive service from a cell after cell reselection or handover. A method and apparatus are disclosed that perform the PBCH decoding across multiple instances that carry partly different and partly common PBCH information. This method enables a client terminal to receive service from a cell faster than conventional methods.

4 Claims, 16 Drawing Sheets

FIG. 6

| DL BW (3 bits) | PHICH CFG (3 bits) | SFN (8 MSBs) | Spare (10 bits) | CRC (16 bits) |

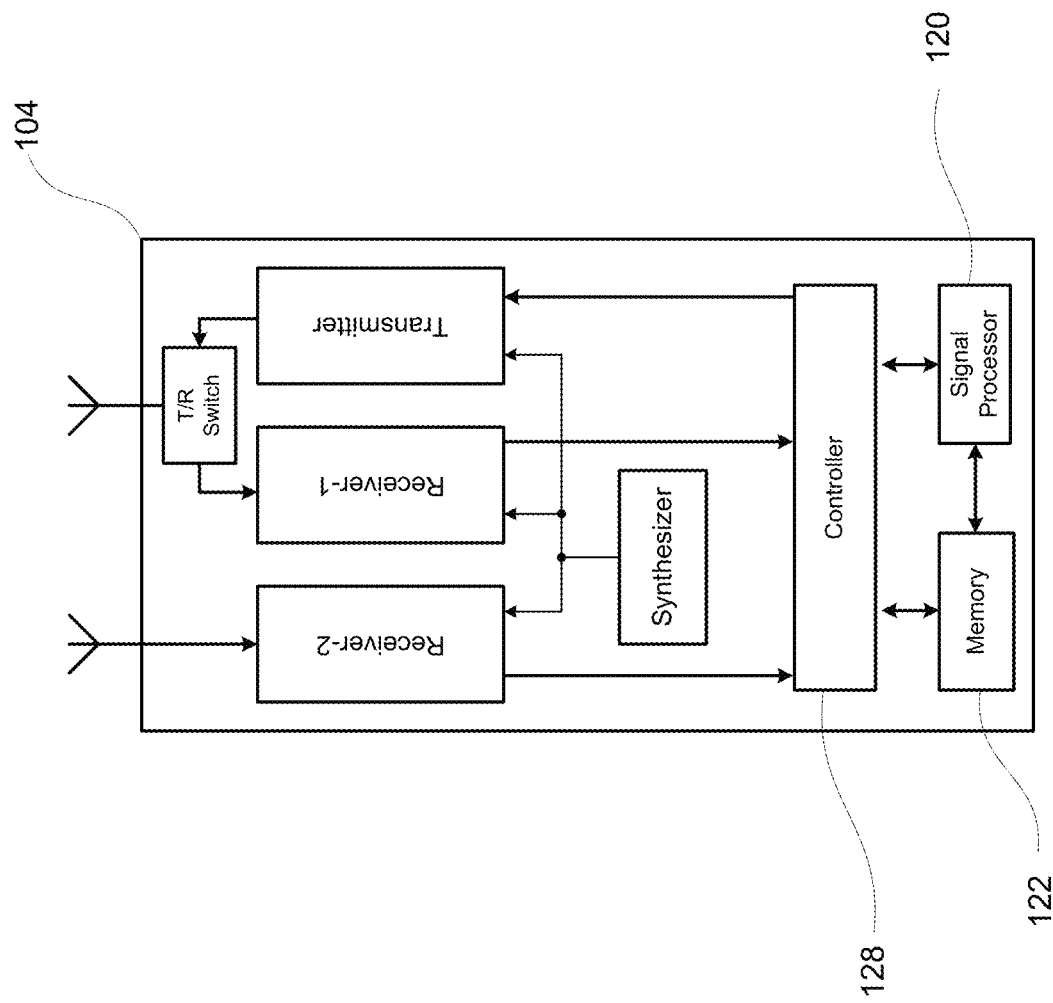

METHOD AND APPARATUS FOR BROADCAST CHANNEL DECODER

BACKGROUND

As shown in FIG. 1, a wireless communication system 10 comprises elements such as a client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station. Cellular wireless communication systems with multiple base stations may be also referred to as wireless communication networks.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station to which the client terminal is communicating is referred to as the serving base station. In some wireless communication systems the serving base station is normally referred to as the serving cell. The terms base station and a cell may be used interchangeably herein. In general, the cells that are in the vicinity of the serving cell are called neighbor cells. Similarly, in some wireless communication systems a neighbor base station is normally referred to as a neighbor cell.

Client terminals used in wireless communication systems may need to search for the network, acquire the network information, camp on to the network and register for service. The aforementioned process is collectively called "network registration." The network registration process may normally take place in different scenarios that may include but are not limited to powering on the client terminal, attempting to obtain service after a loss of network coverage (e.g., a dropped call due to a "dead spot" in the network), when roaming from one network to another, etc.

The $3^{rd}$ Generation Partnership Project (3GPP) Long Term Evolution (LTE) wireless communication system is an example of a cellular wireless communication system. In the 3GPP LTE wireless communication system, the air interface is organized into radio frames, subframes, and Orthogonal Frequency Division Multiplexing (OFDM) symbols as shown in FIG. 2, where the radio frame duration is 10 ms, the subframe duration is 1 ms and an OFDM symbol duration is about 70 μs or 85 μs depending on whether Normal Cyclic Prefix (CP) or Extended CP is used respectively. Each radio frame is numbered and identified by the System Frame Number (SFN). The SFN starts from zero and increments for each radio frame up to 1023 and then wraps around to zero and so on. Therefore, the SFN can be represented as a 10-bit number and it is incremented at the start of every radio frame.

The radio frame and subframe boundary are detected by the client terminal during the cell search procedure by first detecting the Primary Synchronization Signal (PSS) and then Secondary Synchronization Signal (SSS) as shown in FIG. 2. The PSS and SSS detection timing is relative to the internal timing of the client terminal and it is referred to herein as timing offset. The radio frame and subframe start timing is derived from the timing offsets of the detected PSS and SSS. The SSS detection requires the PSS time offset as an input from the PSS detection procedure. Therefore, the SSS detection may be scheduled after successful PSS detection. When a client terminal may not be synchronized with any of the base stations, such as in the case of initial power on, it must first find the synchronization information such as the air interface timing and frequency.

In the 3GPP LTE wireless communication system, the network may use a number of different channel bandwidths. However, the synchronization signals PSS, SSS and Physical Broadcast Channel (PBCH) are transmitted in the central 1.4 MHz as illustrated in FIG. 2 where the channel bandwidth used is 3 MHz in this example. Also, the SFN and the Physical Hybrid Automatic Repeat Request (HARM) Indicator Channel (PHICH) configuration information are required for the client terminal to receive further details about the network. The above information is transmitted by each BS in the Physical Broadcast Channel (PBCH). The payload inside the PBCH is referred as Master Information Block (MIB). The MIB is used for further processing in the client terminal for network registration. The PBCH is transmitted in subframe 0 of every radio frame in the central 1.4 MHz bandwidth of the channel as illustrated in FIG. 2.

The timing of the receive window for decoding PBCH is based on the radio frame and subframe timing detected for a given cell based on SSS detection for that cell. Therefore, the PBCH detection may be scheduled only after successful SSS detection for that cell. In the remainder of the present disclosure whenever SSS detection is scheduled it is implicit that it is preceded by a successful PSS detection. Similarly, whenever PBCH detection is scheduled it is implicit that it is preceded by a successful SSS detection.

The payload of the PBCH does not change over a period of four radio frames as shown in FIG. 3. This allows the client terminal to perform combining of the PBCH over four radio frames as shown in FIG. 4. The duration over which the PBCH payload content, i.e., MIB, remains the same is referred herein as MIB Transmission Time Interval (TTI). However, the PBCH contains the SFN in the MIB payload and the change of the SFN in payload occurs every four frames on a boundary where SFN modulo four is equal to zero as shown in FIG. 4. The SFN in the MIB contains only its upper eight most significant bits (MSBs). The two least significant bits (LSBs) of the SFN are zero for the frame where the change of the MIB content occurs. Since the client terminal is not aware of the SFN, the combining must be done over a period of seven frames while pursuing multiple parallel hypotheses as shown in FIG. 5. Each hypothesis starts at a new radio frame and corresponds to the two least significant bits of the SFN being equal to zero. Only one of the four hypotheses can be correct and in the worst case it may be the last hypothesis that may be correct. For the example illustrated in FIG. 5, the hypothesis 4 is correct as the SFN is 104, which has two least significant bits equal to zero. Therefore, the worst case time required for one complete PBCH decode attempt for one cell is seven frames (7*10=70 ms). Furthermore, if the signal conditions are poor, even after exhausting all the hypotheses, the PBCH decoding may fail. The client terminal may have to reattempt to decode the PBCH which may require another 70 ms time to pursue all the hypotheses. Although the SFN portion of the MIB may change from one TTI to another, the remaining portion of the MIB generally remains unchanged over a very long period of time such as hours to days.

SUMMARY

A method and apparatus are disclosed that enable enhanced PBCH decoding by client terminals in a cellular communication system by taking advantage of the a priori information that a portion of the MIB may not change from one TTI to another and that the SFN changes sequentially. This a priori information may be used for combining information from MIB received across different TTIs.

In accordance with an aspect of the present disclosure, a method for broadcast channel decoding of Physical Broadcast Channel (PBCH) at a client terminal, wherein the PBCH is formed from sets of a plurality of a predetermined radio frames and each of the sets has a Transmission Time Interval (TTI) and each of the radio frames is composed of a Master Information Block (MIB) payload and Cyclic Redundancy Check (CRC) and includes a same predetermined number of fixed coded bits, may include controlling, by a processing device at the client terminal, combining the predetermined number of fixed coded bits for a predetermined number of the radio frames across a plurality of different TTIs, wherein the combining is performed at least one of (i) before applying scrambling based on a scrambling phase as per a radio frame offset within a given TTI, (ii) for all radio frame offsets within a predetermined number of TTIs, or (iii) after applying the scrambling based on the scrambling phase as per the radio frame offset within the given TTI.

In one alternative, the combining the predetermined number of fixed coded bits for the predetermined number of the radio frames across the different TTI may be performed at an equalized received demodulated symbol level corresponding to the predetermined fixed coded bits for the predetermined number of the radio frames.

In one alternative, the combining the predetermined number of fixed coded bits for the predetermined number of the radio frames across the different TTIs may include combining the predetermined number of fixed coded bits for the predetermined number of the radio frames.

In one alternative, the combining the predetermined number of fixed coded bits for the predetermined number of the radio frames may be performed across adjacent TTIs or four contiguous or non-contiguous TTIs.

In one alternative, the MIB payload may include a System Frame Number (SFN) field of eight bits wide, and the method further may include controlling, by the processing device, combining potentially identical coded bits corresponding to X Most Significant Bits (MSBs) of the SFN field across $2^{8-X}$ TTIs.

In one alternative, the method may further include controlling, by the processing device, after the client terminal has decoded a PBCH of a serving cell, using a channel bandwidth and a PHICH configuration of the serving cell for decoding a PBCH of a neighbor cell.

In one alternative, the method may further include controlling, by the processing device, the channel decoding of the PBCH by performing tail-biting convolutional coding (TBCC) on a K=40 bit input block of bits of the MIB payload and CRC of a given radio frame, in which the MIB payload includes a DL Bandwidth (DL BW) field 3 bits in width, a Physical Hybrid Automatic Repeat Request (HARQ) Indicator Channel (PHICH) Configuration 3 bits in width, a System Frame Number (SFN) field eight bits in width and a spare field 10 bits in width, and in which the TBCC is by L−1 shift registers initialized with a last L−1 bits of the 40 bit input block, in which L is a predetermined constraint length, in which decoding of an output corresponding to a seventh input bit is performed using a known state of the shift registers at that time.

In one alternative, the method may further include controlling, by the processing device, starting Viterbi decoding with a second known state based on known first six bits of the PBCH payload and starting the decoding from output bits corresponding to the seventh input bit, continuing the decoding through a buffer associated with the decoding to wrap around to a sixth input bit such that a final state is same as a known initial state.

In one alternative, the method may further include controlling, by the processing device, during the decoding, pruning each path known to be invalid.

In accordance with an aspect of the present disclosure, an apparatus may provide for broadcast channel decoding of Physical Broadcast Channel (PBCH) at a client terminal, wherein the PBCH is formed from sets of a plurality of a predetermined radio frames and each of the sets has a Transmission Time Interval (TTI) and each of the radio frames is composed of a Master Information Block (MIB) payload and Cyclic Redundancy Check (CRC) and includes a same predetermined number of fixed coded bits, where the apparatus may include circuitry configured to control, at the client terminal, combining the predetermined number of fixed coded bits for a predetermined number of the radio frames across a plurality of different TTIs, wherein the combining is performed at least one of (i) before applying scrambling based on a scrambling phase as per a radio frame offset within a given TTI, (ii) for all radio frame offsets within a predetermined number of TTIs, or (iii) after applying the scrambling based on the scrambling phase as per the radio frame offset within the given TTI.

In one alternative of the apparatus, the combining the predetermined number of fixed coded bits for the predetermined number of the radio frames across the different TTI may be performed at an equalized received demodulated symbol level corresponding to the predetermined fixed coded bits for the predetermined number of the radio frames.

In one alternative of the apparatus, the combining the predetermined number of fixed coded bits for the predetermined number of the radio frames across the different TTIs may include combining the predetermined number of fixed coded bits for the predetermined number of the radio frames.

In one alternative of the apparatus, the combining the predetermined number of fixed coded bits for the predetermined number of the radio frames may be performed across adjacent TTIs or four contiguous or non-contiguous TTIs.

In one alternative of the apparatus, the MIB payload may include a System Frame Number (SFN) field of eight bits wide, and wherein the circuitry may be configured to control combining potentially identical coded bits corresponding to X Most Significant Bits (MSBs) of the SFN field across $2^{8-X}$ TTIs.

In one alternative of the apparatus, the circuitry may be configured to control, after the client terminal has decoded a PBCH of a serving cell, using a channel bandwidth and a PHICH configuration of the serving cell for decoding a PBCH of a neighbor cell.

In one alternative of the apparatus, the circuitry may be configured to control the channel decoding of the PBCH by performing tail-biting convolutional coding (TBCC) on a K=40 bit input block of bits of the MIB payload and CRC of a given radio frame, in which the MIB payload includes a DL Bandwidth (DL BW) field 3 bits in width, a Physical Hybrid Automatic Repeat Request (HARQ) Indicator Channel (PHICH) Configuration 3 bits in width, a System Frame Number (SFN) field eight bits in width and a spare field 10 bits in width, and in which the TBCC is by L−1 shift registers initialized with a last L−1 bits of the 40 bit input block, in which L is a predetermined constraint length, in which decoding of an output corresponding to a seventh input bit is performed using a known state of the shift registers at that time.

In one alternative of the apparatus, the circuitry may be configured to control starting Viterbi decoding with a second known state based on known first six bits of the PBCH payload and starting the decoding from output bits corresponding to the seventh input bit, continuing the decoding through a buffer associated with the decoding to wrap around to a sixth input bit such that a final state is same as a known initial state.

In one alternative of the apparatus, the circuitry may be configured to control, during the decoding, pruning each path known to be invalid.

In accordance with an aspect of the present disclosure, a wireless communication device may include a receiver to receive a wireless communication; and a processing device configured for broadcast channel decoding of Physical Broadcast Channel (PBCH) at the wireless communication device, wherein the PBCH is formed from sets of a plurality of a predetermined radio frames and each of the sets has a Transmission Time Interval (TTI) and each of the radio frames is composed of a Master Information Block (MIB) payload and Cyclic Redundancy Check (CRC) and includes a same predetermined number of fixed coded bits, wherein the processing device may be configured to control combining the predetermined number of fixed coded bits for a predetermined number of the radio frames across a plurality of different TTIs, wherein the combining is performed at least one of (i) before applying scrambling based on a scrambling phase as per a radio frame offset within a given TTI, (ii) for all radio frame offsets within a predetermined number of TTIs, or (iii) after applying the scrambling based on the scrambling phase as per the radio frame offset within the given TTI.

In one alternative of the wireless communication device, the combining the predetermined number of fixed coded bits for the predetermined number of the radio frames across the different TTI may be performed at an equalized received demodulated symbol level corresponding to the predetermined fixed coded bits for the predetermined number of the radio frames.

BRIEF DESCRIPTION OF THE DRAWINGS

FIG. 6 illustrates arrangement of the various fields that form the MIB payload.

FIG. 17 illustrates a Radio Frequency (RF) subsystem for a wireless mobile station, which may be employed with aspects of the invention described herein.

DETAILED DESCRIPTION

Figure 1:
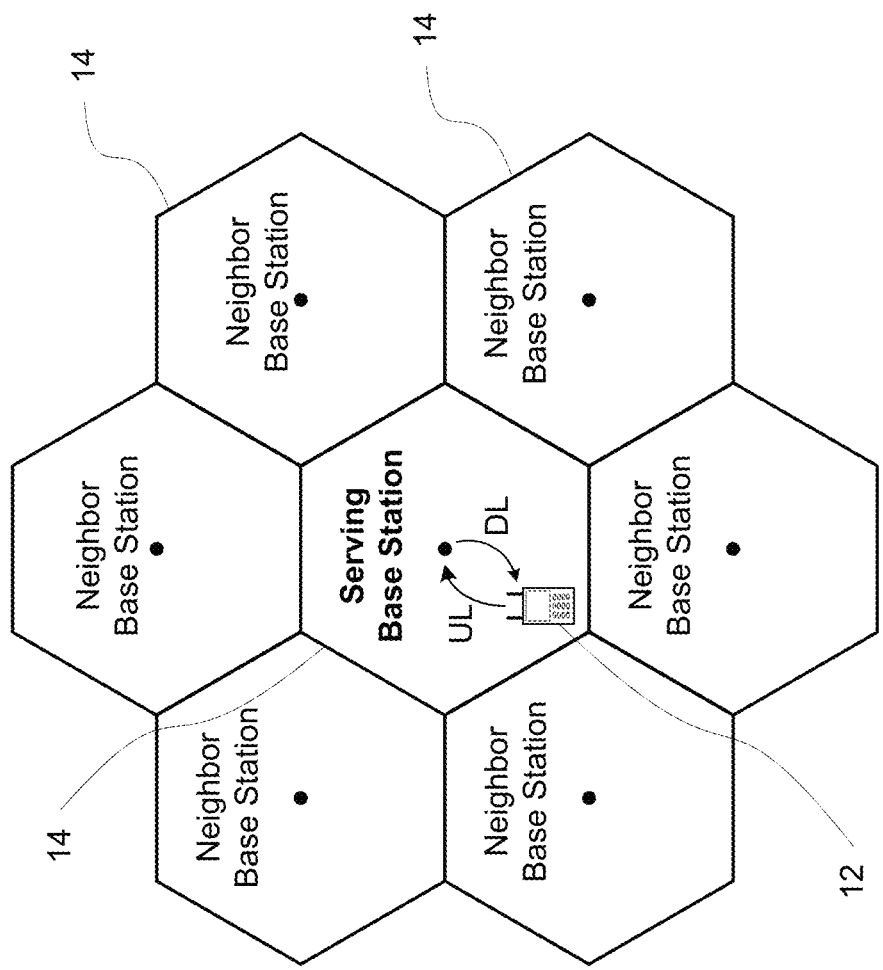
FIG. 1 illustrates a conventional mobile wireless communication system.
Figure 2:
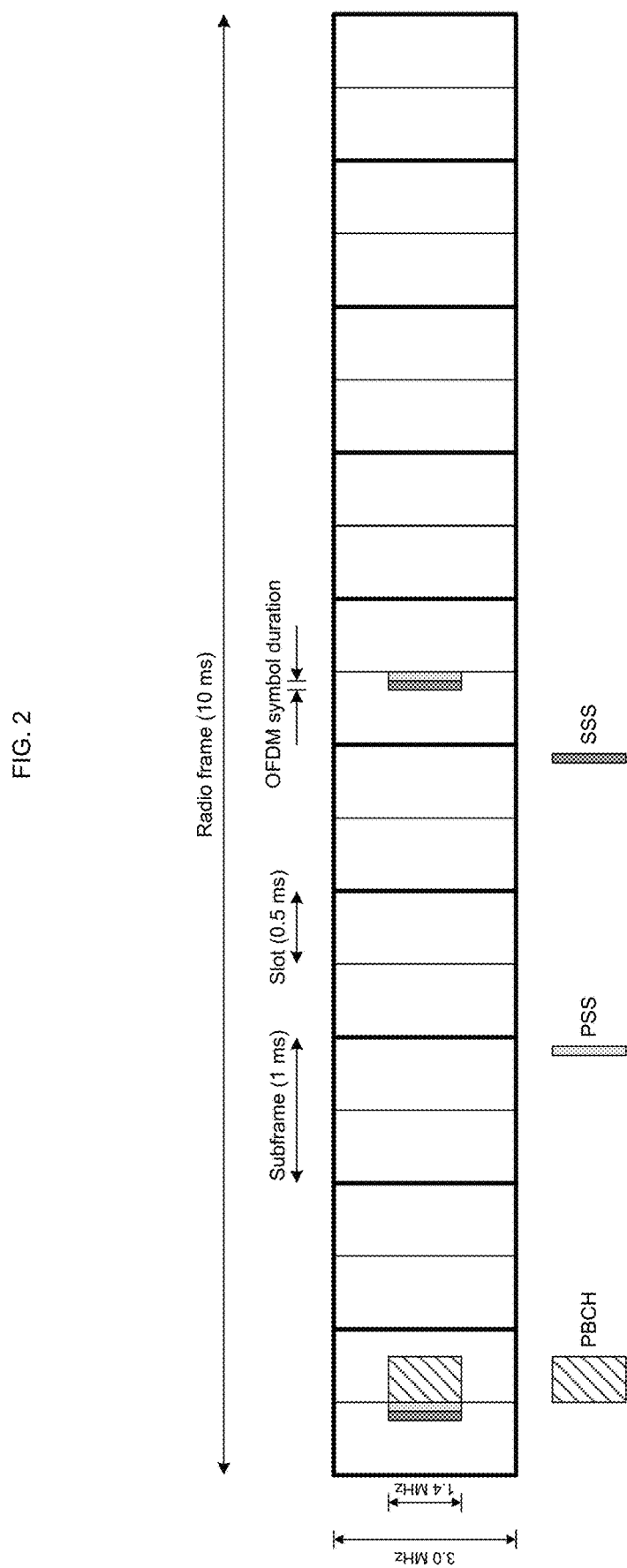
FIG. 2 illustrates a high level air-interface structure of the 3$^{rd}$ Generation Partnership Project (3GPP) Long Term Evolution (LTE) wireless communication system.
Figure 3:
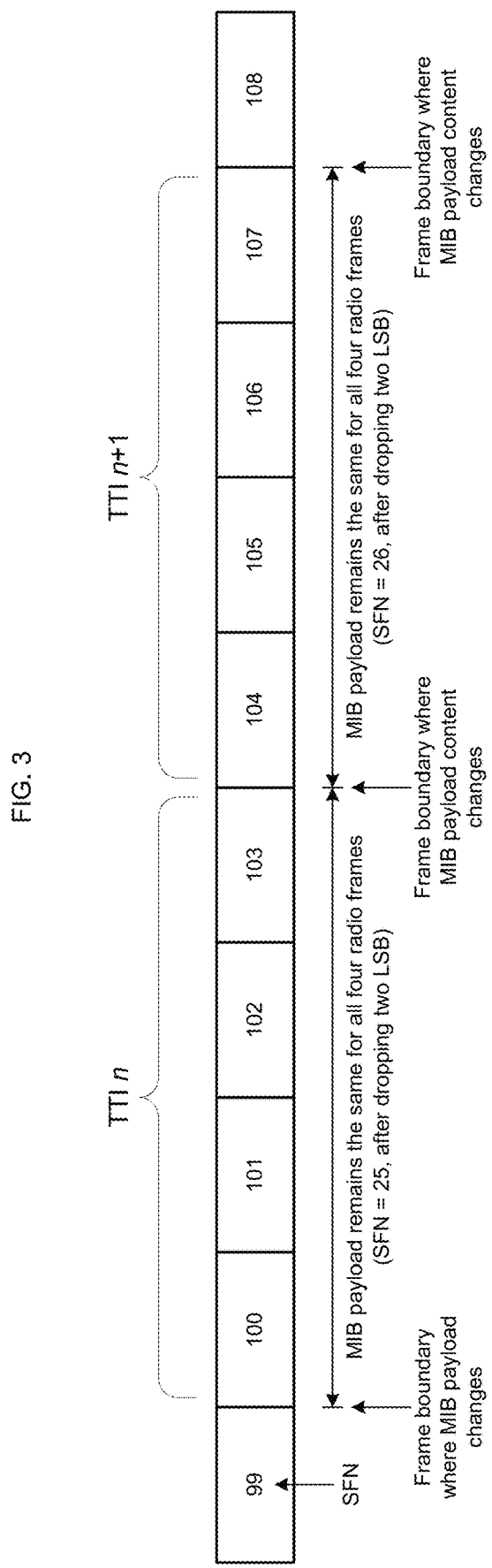
FIG. 3 illustrates the radio frame number mapping to the radio frames and Master Information Block (MIB) payload.
Figure 4:
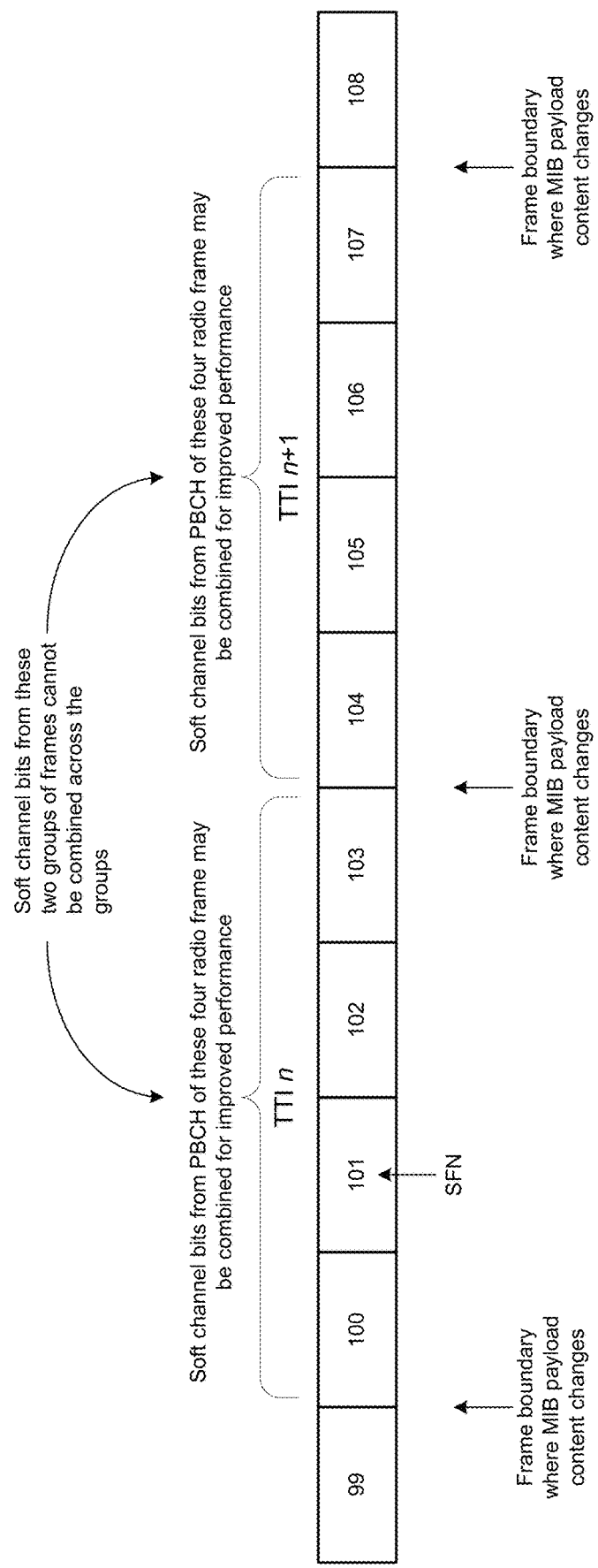
FIG. 4 illustrates the combining of information from four radio frames over which the same MIB payload is transmitted.
Figure 5:
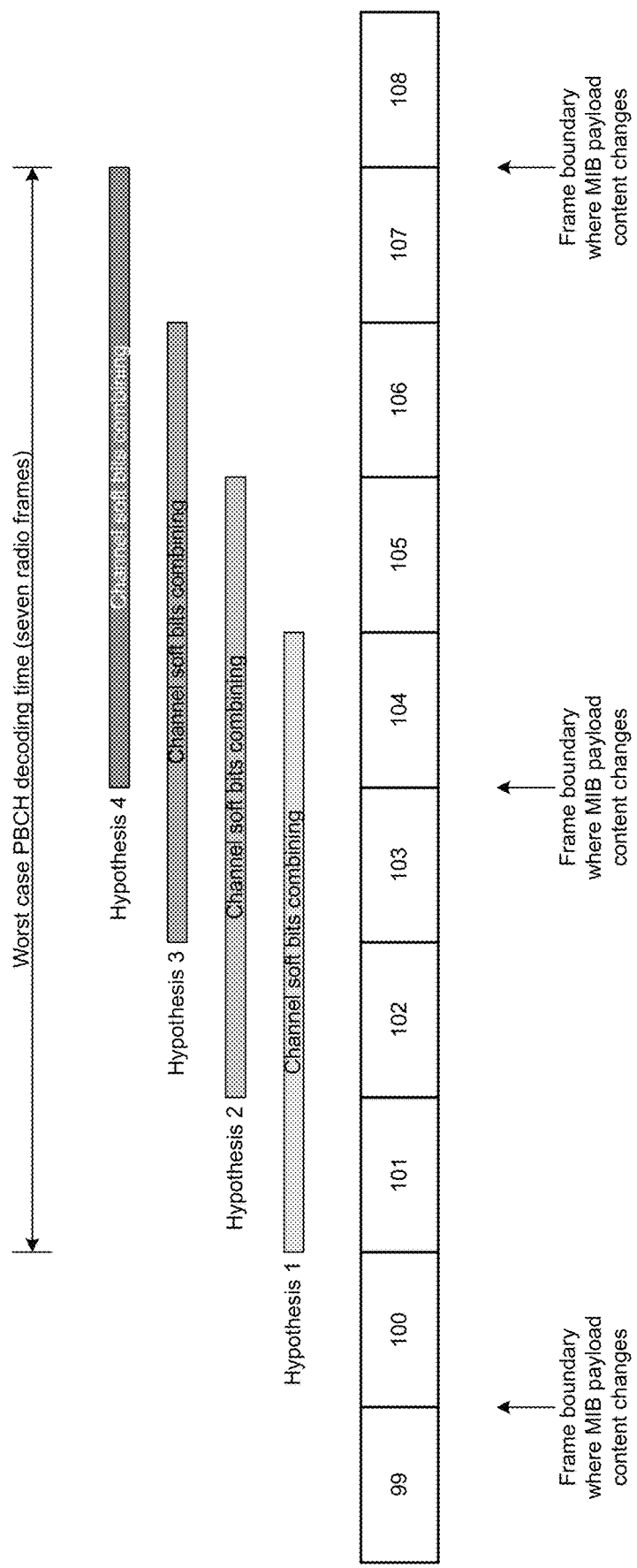
FIG. 5 illustrates the combining of MIB information from four radio frames and pursuit of parallel hypotheses.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

The arrangement of the various fields that form the MIB payload and its Cyclic Redundancy Check (CRC) is as illustrated in FIG. 6. The first field is the DL Bandwidth (DL BW) and it is 3-bits wide. This field indicates the channel bandwidth used by the cell on which the PBCH is received. The second field is the PHICH Configuration (PHICH CFG) and it is 3-bits wide. This field indicates the amount of channel resources used by the PHICH. The third field is the upper eight MSBs of the SFN. Next 10-bits are reserved for future updates to the specification. These total 24-bits form the MIB payload. As part of the channel coding of the PBCH, a 16-bit CRC is computed and appended to the payload.

Figure 7:
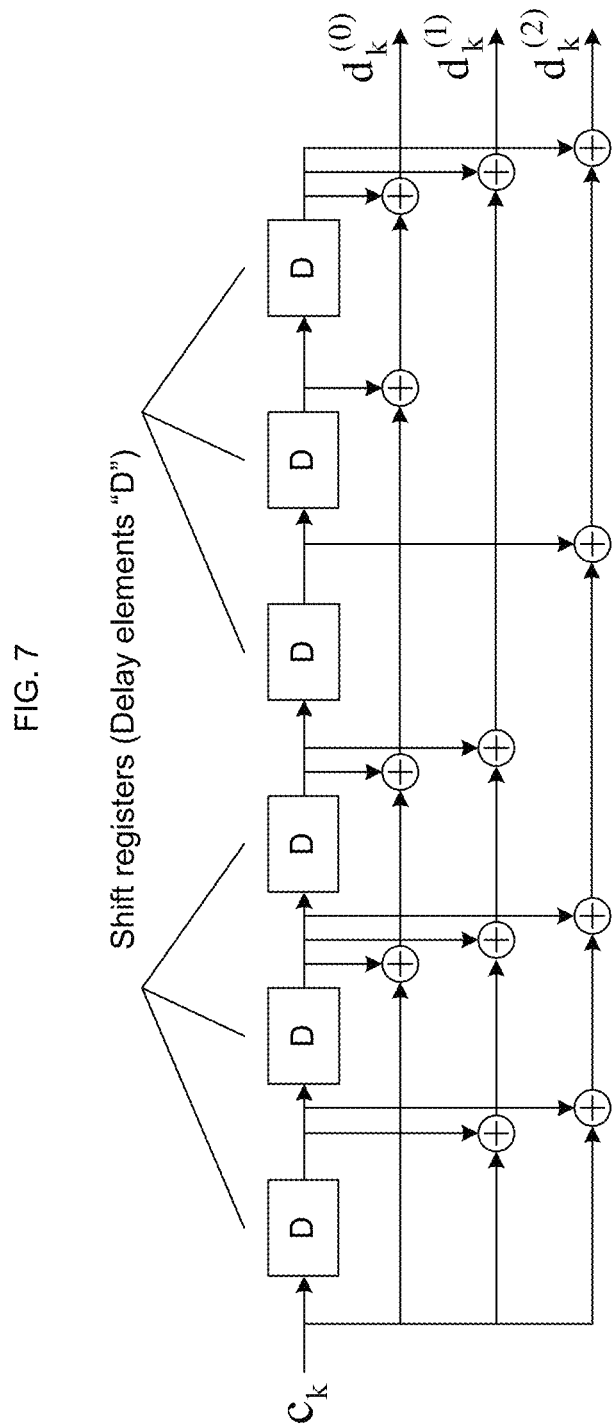
FIG. 7 illustrates the rate 1/3 convolutional encoder portion for Physical Broadcast Channel (PBCH) encoding.
Figure 8:
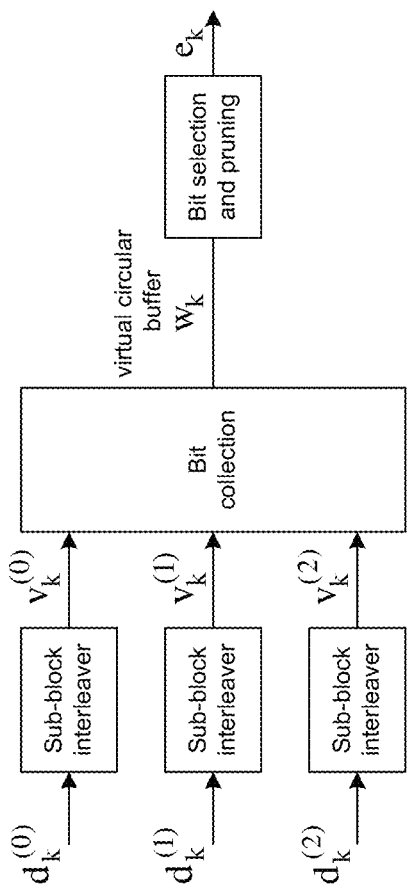
FIG. 8 illustrates subblock interleaving and rate matching portion for the PBCH encoding.

Next the tail-biting convolutional coding (TBCC) is performed on the K=40-bit input block of bits $c_k$ (k=0, 1, . . . , K−1) consisting of MIB payload and CRC. The TBCC in 3GPP LTE wireless communication systems uses a constraint length L=7, rate 1/3 convolutional encoder as illustrated in FIG. 7. The TBCC requires that the state of the L−1 shift registers "D" in FIG. 7 be initialized with the last L−1 bits on the 40-bit input block. As illustrated in FIG. 7, the output of the TBCC comprises three streams $d_k^{(0)}$, $d_k^{(1)}$, and $d_k^{(2)}$ each of length K=40 bits. Next, as illustrated in FIG. 8, the output of the three streams is input to their respective subblock interleavers and their output is labeled $v_k^{(0)}$, $v_k^{(1)}$, and $v_k^{(2)}$ each of length K=40 bits. Next the subblock interleaver output is arranged in a single circular buffer whose total length is 3*K=120 bits. Finally, the required number of bits is selected from the circular buffer depending on the available channel resources. In case of Normal CP 1920 bits and in case of Extended CP 1728 bits can be mapped to the PBCH. Since the circular buffer is only 120 bits long, all the required bits for mapping to the PBCH are generated through repetition by continuing to read the circular buffer in a circular manner until the required number of bits are read out.

The output of the TBCC for each input bit depends on the value of the input bit and the current state of the L–1 shift registers. At the start of the encoding, the TBCC is initialized with the last L–1=6 bits from the 40-bit input block. The CRC will vary for each TTI since the payload is changing for each TTI. Therefore, even though the first two fields (6-bits) of MIB may remain the same from one TTI to another, the initial state of the TBCC may not be the same. Therefore, the output of the TBCC may be different at the beginning even though the first six input bits to the TBCC may be identical across TTIs. However, as the encoding continues the new input bits flush the old bits from the shift registers of the TBCC and the input bits become the new contents of the shift registers.

Figure 9:
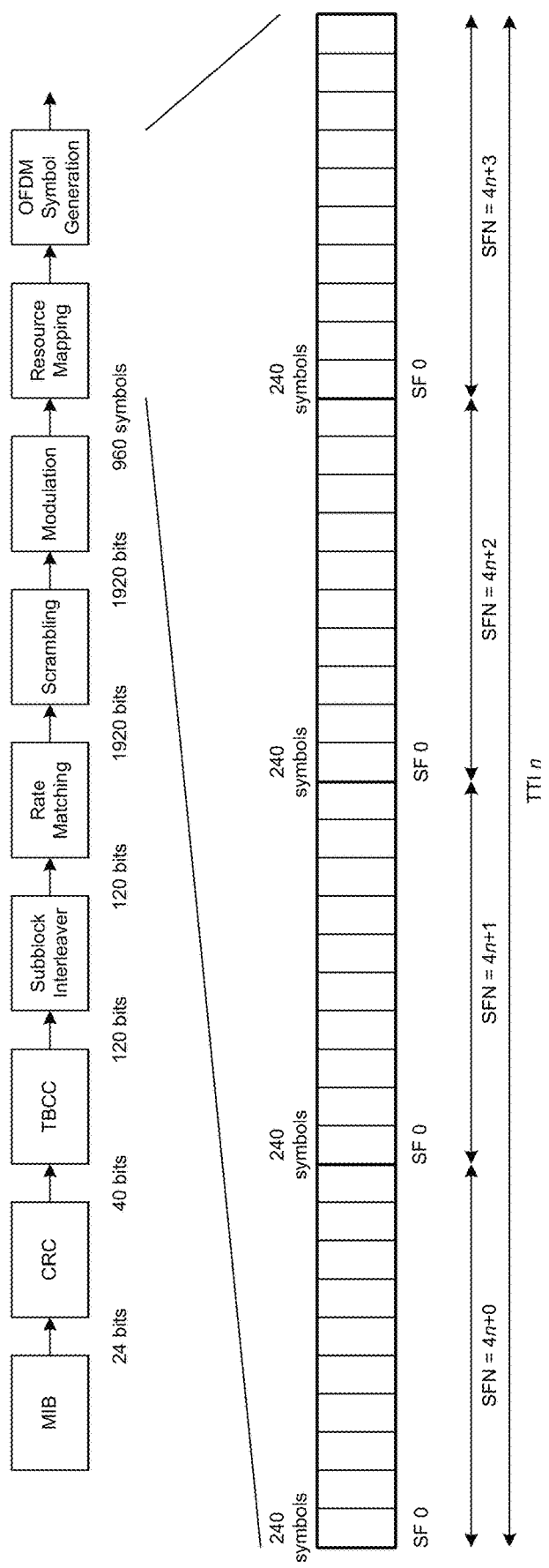
FIG. 9 illustrates the entire PBCH encoder processing chain and mapping to the channel resources.
Figure 10:
FIG. 10 illustrates the entire PBCH decoder processing chain.

Referring to the FIG. 6, the 10-bit spare field may remain the same across TTIs. Therefore, the status of the shift registers, after the first six bits of the spare field are input, may be the same for all TTIs regardless of the contents of the other fields in the 40-bit input block of data. Therefore, the TBCC output corresponding to the last four bits of the 10-bit spare field may be the same. This is true for all three output streams of the TBCC. Therefore, this produces total 4*3=12 bits that may be the same across a number of TTIs over a relatively long time regardless of the contents of the rest of the MIB. These 12-bits are referred herein as fixed coded bits. Note that this is true regardless of the particular value of the 10-bit spare field. As long as the spare field value does not change from one TTI to another, the above identified 12 fixed coded bits will remain identical across different TTIs. These 12-bits correspond to 12/120=10% of the coded bits. Furthermore, if the TBCC output bits are repeated, then some or all of the 12 fixed coded bits may also be repeated. Specifically, in case of Normal CP, each radio frame in one TTI can carry 480 bits and a total of 480*4=1920 bits in one TTI. Therefore, in one radio frame, the 120 coded bits output from TBCC will be repeated four times. Therefore, the 12 fixed coded bits will also be repeated four times in one radio frame and total of 16 times in one TTI. The overall PBCH encoding process is illustrated in FIG. 9. After the rate matching as described in FIG. 8, the next step as shown in FIG. 9 is scrambling. The scrambling is different for the four different radio frames in a TTI. Therefore, although the fixed coded bits in different frames of a TTI may be identical, the scrambled bits may be different. Next the scrambled bits are used to generate Quadrature Phase Shift Keying (QPSK) modulated symbols by using two bit pairs from input data. Finally the QPSK modulated symbols are mapped to the channel resources designated for the PBCH as illustrated in bottom part of FIG. 9. At the receiver the reverse processing is performed with few additional steps as illustrated in FIG. 10. The rate matching function that leads to repetition at the encoder side is replaced by the combining of the soft bits for the corresponding bits. The conventional Viterbi decoder is used for TBCC decoding with the required handling for the tail-biting encoder. The descrambling requires the knowledge of the SFN offset within a TTI. There are four different possibilities for the scrambling corresponding to these four offsets and they are referred to as scrambling phases.

Figure 11:
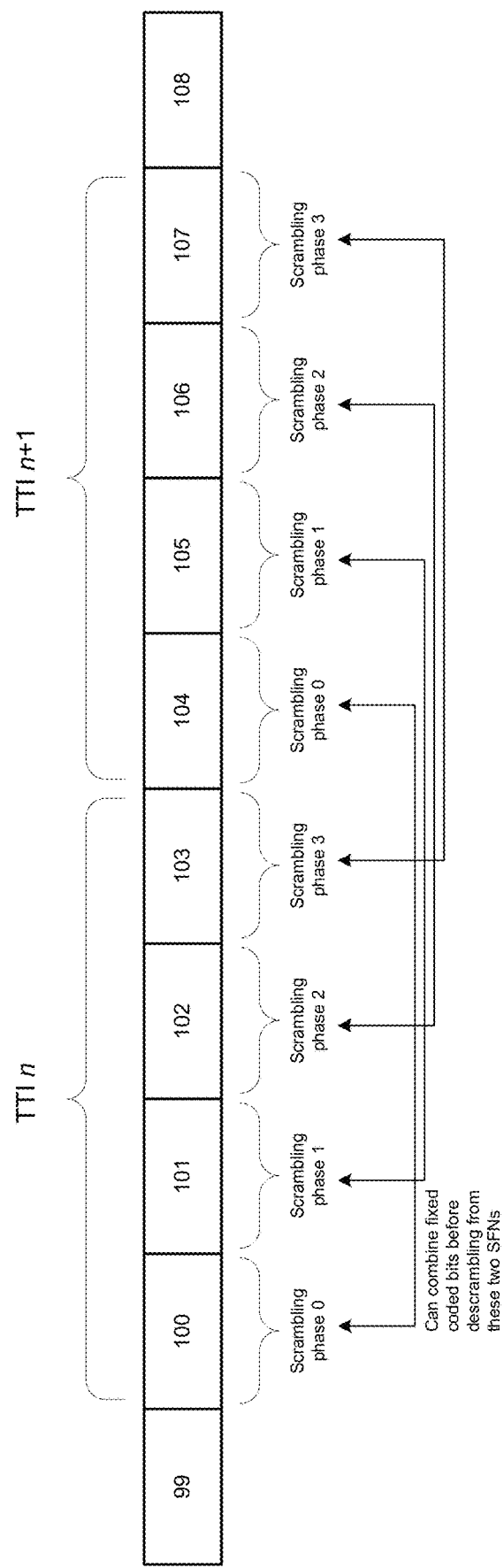
FIG. 11 illustrates the combining of the soft bits corresponding to fixed coded bits according the aspect of the present disclosure.

According to an aspect of the present disclosure, the received soft bits corresponding to the 12 fixed coded bits and their repetitions may be combined across different TTIs. According to an aspect of the present disclosure, the combining may be performed at different levels. In one embodiment, the combining may be performed before applying the scrambling based on the scrambling phase as per the radio frame offset within a TTI as illustrated in FIG. 11. This embodiment may be useful since the scrambling phase itself may be unknown until the MIB is detected. Similar combining may be performed for all radio frame offsets within the TTIs as illustrated in FIG. 11. In another embodiment, the combining may be performed after applying the scrambling based on the scrambling phase as per the radio frame offset within a TTI. Since the different scrambling that is present in each radio frame within a TTI is removed, the combining may be performed within and across the TTIs.

According to an aspect of the present disclosure, the combining across the MIB TTI may be performed at the equalized received demodulated symbol level corresponding to the 12 fixed coded bits and their repetitions. Note that since two bits are mapped to a single QPSK modulated symbol, unless both of the bits are the same across TTI, the combining at received modulated symbol level may not be done. However, as noted earlier, the 12 fixed coded bits start at an even boundary which ensures that they are mapped to QPSK symbols such that two bits forming the symbols come from the 12 fixed coded bits and their repetitions.

According to an aspect of the present disclosure, the combining across the MIB TTI may be performed by combining the soft bits corresponding to the 12 fixed coded bits and their repetitions. The soft bits are also referred to as the Log Likelihood Ratios (LLRs).

According to an aspect of the present disclosure, the combining across TTIs for the 12 fixed coded bits and their repetitions may be performed over any number of desired TTIs. For example, the 12 fixed coded bits and their repetitions may be combined across adjacent TTI, or may be combined across four contiguous or non-contiguous TTIs, etc.

Figure 12:
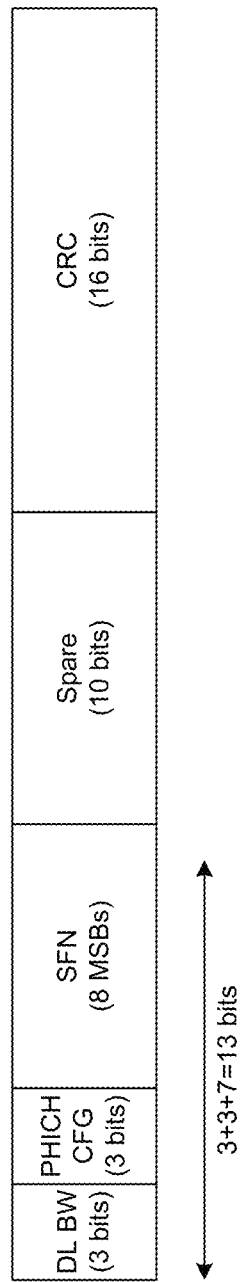
FIG. 12 illustrates the location of MIB payload bits that may lead to potentially identical coded bits in adjacent MIB Transmission Time Intervals (TTIs) according the aspect of the present disclosure.

The SFN increments sequentially for each frame. The value of the eight MSBs of the SFN in the MIB payload change sequentially by one for every four radio frames, i.e., once every MIB TTI. In any given SFN increment, all the bits of the 8-bit SFN field can change. For example, when the SFN value increments and wraps around from 1020 (in binary: 1111111100) to 0 (in binary: 0000000000), all the bit values change (8 MSBs underlined). However, as the value of the SFN changes sequentially, the LSBs of the 8-bit field are more likely to change than the MSBs. For example, when the SFN value increments from 0 (in binary: 0000000000) to 4 (in binary: 0000000100), only one bit value changes (8 MSBs underlined). In another example, when the SFN value increments from 80 (in binary: 0001010000) to 84 (in binary: 0001010100), only one bit value changes (8 MSBs underlined). For the case where only the LSB of the 8-bit SFN field changes in the MIB payload across adjacent TTI, total of first 6+7=13 bits may be the same across the TTI as illustrated in FIG. 12. However, as noted earlier, the output corresponding to the first six bits of the payload is affected by the contents of the shift register which may be different for different TTIs. However, since the first six bits are expected to be the same across TTIs, the next shift register state for the next set of input bits will be identical across all TTIs. Therefore, if any MSBs of the SFN field are the same across the TTIs, they will lead to the same TBCC output bits. Specifically, for the case of adjacent TTIs (even TTI followed by odd TTI), the next seven bits are the same. Therefore the TBCC output corresponding to these seven bits will be identical for all three streams. A similar approach can be applied to an additional number of TTIs. For example, if only the six MSBs of the SFN field are considered, then the output corresponding to those bits can be combined across four consecutive TTIs, and so on where a lesser number of bits can be combined across a larger number of TTIs. However, since the PBCH is not yet decoded, the SFN and the TTI boundaries where the MSBs also change may not be known.

According to an aspect of the present disclosure, the combining of potentially identical coded bits across TTIs corresponding to the X MSBs of the 8-bit SFN field may be performed blindly and exhaustively across $2^{8-X}$ TTIs. For example, to take advantage of the potentially identical coded bits corresponding to 7 MSBs of the 8-bit SFN field, PBCH decoding can be performed with or without combining of potentially coded identical bits across $2^{8-7}=2$ TTIs for the coded bits corresponding to the 7 MSBs of the SFN. Based on the CRC check after performing the PBCH decoding, any false hypothesis regarding the potentially identical coded bits may be eliminated. This gives total of 7*3=21 bits out of the total 120 coded bits. These 21 bits correspond to 21/120=17.5% of the coded bits. Together the 12 fixed coded bits and the 21 potentially identical bits lead to (12+21)/120=27.5% of the coded bits. This additional level of combining may provide considerable improvement in the PBCH decoding performance.

The PBCH decoding may be performed for neighbor cells in a 3GPP LTE cellular wireless communication network. In most 3GPP LTE cellular wireless communication networks, the DL channel bandwidth and the PHICH configuration may be identical for many or all cells for a particular channel. Therefore, according to an aspect of the present disclosure, once a client terminal has decoded the PBCH of its serving cell, it may assume, with a small risk of error, that both the channel bandwidth and the PHICH configuration for neighbor cells to be the same as the serving cell and therefore known. This a priori information is then used for improved PBCH decoding performance.

The TBCC is different from the conventional zero-tailed convolutional code (ZTCC) where the initial state of the shift registers is set to zeros and at the end of the input block, required number of zeros is padded to force the final state of the shift registers to zeros. This enables the decoder at the receiver to begin decoding from a known start state of the shift register and known final state of the shift register. This may offer improved performance for ZTCC compared to TBCC but at the cost of sending redundant zero-padded bits which may reduce the bandwidth efficiency. The impact of reduced bandwidth is usually significant for small payloads such as in the case of PBCH. Therefore, the TBCC is used in 3GPP LTE cellular wireless communication systems for small payloads.

By taking advantage of the known values of the DL channel bandwidth and the PHICH configuration, the state of the shift register after the first six bits are input to the encoder may be known. Since the TBCC initializes the initial state of the shift registers to the values of the tail of the input block of the data, the initial and final state of the shift registers are the same, even though the actual state is not known.

According to an aspect of the present disclosure, the receiver may perform decoding of the output corresponding to the seventh input bit using the known state of the shift register at that time. This known state value may improve the performance of the TBCC to the same level as that of ZTCC without the cost of reduced bandwidth efficiency caused by transmission of redundant bits.

The Viterbi decoder is often used for decoding convolutionally encoded data. In the case of conventional TBCC, since the initial and final states are not known, typically the Viterbi decoding is performed over the same data multiple times by forming a "circular" or "extended" buffer by repeating the same data. The metrics for all the states of the Viterbi decoder may be set to identical values at the start of the decoding. The values of the state metrics at the end of running Viterbi decoder over entire set of data may be used for running the Viterbi decoder again on the same set of data. After a number of such iterations, the Viterbi decoder may converge to a solution or it may be stopped after performing a configured maximum number of iterations.

Figure 13:
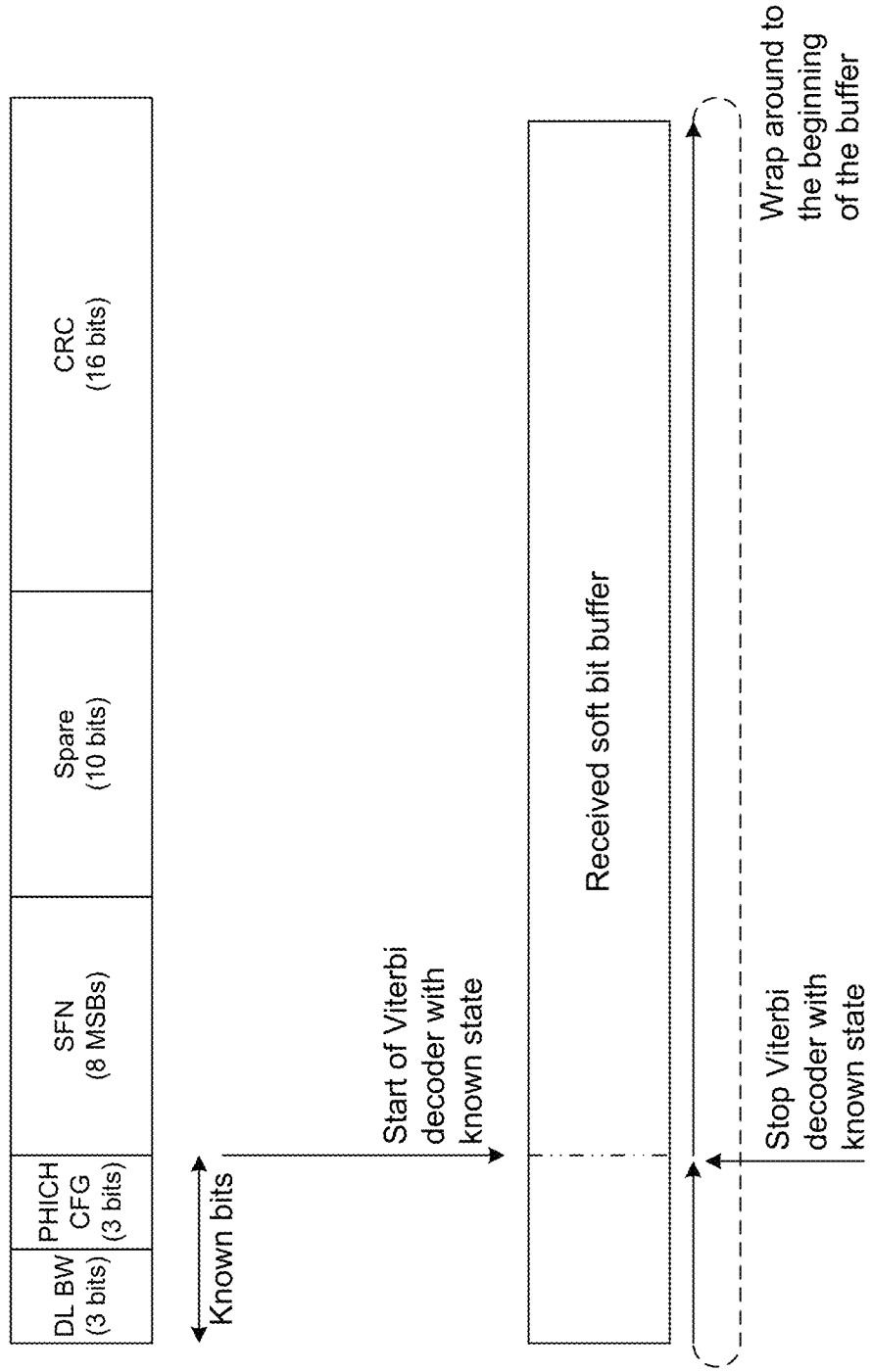
FIG. 13 illustrates the processing flow of Viterbi decoder when the state of the encoder is known for at least one of the input/output bits according the aspect of the present disclosure.

According to an aspect of the present disclosure, the Viterbi decoder may be started with a known state (based on the known first six bits of the PBCH payload) and start decoding from the output bits corresponding to the seventh bit of the input data and then continue through the buffer and wrap around to the sixth bit of the input data such that the final state is the same as the known initial state. In the course of running the Viterbi decoder, the paths that are known to be invalid may be pruned to increase the decoding performance. An example of this the processing flow is illustrated in FIG. 13.

Although the aspects of the present disclosure are described using the 3GPP LTE wireless communication system as an example, these aspects are applicable to other communications systems, storage systems, or any other systems where information may be partly common and fixed and partly variable and different across multiple instances of that information. Some of the aspects of the present disclosure are applicable where the Viterbi decoding is required and some of the states of the encoder may be known a priori.

By way of example only, the above-described method may be implemented in a receiver, e.g., a user device such as a wireless mobile station (MS) 12 as shown in FIG. 1.

Figure 14:
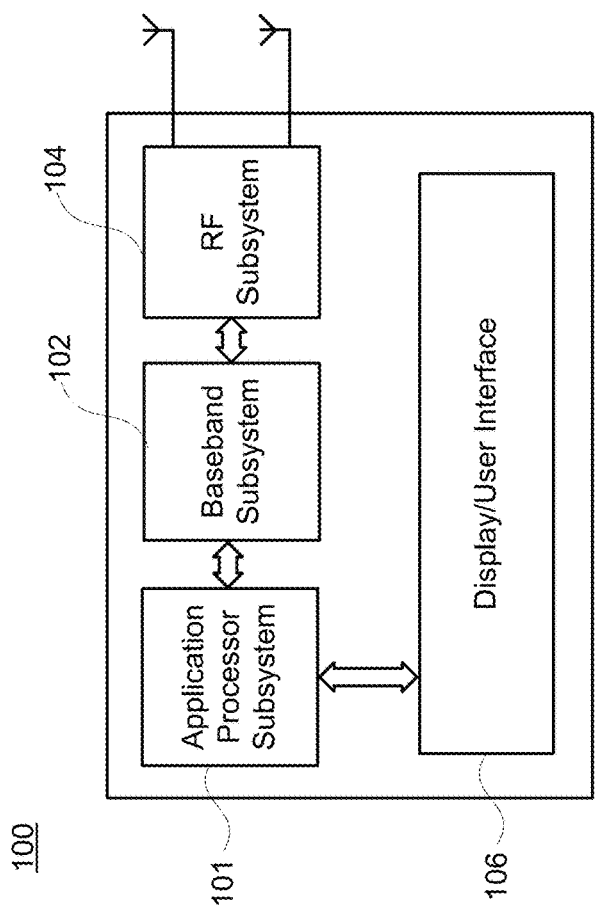
FIG. 14 illustrates a wireless mobile station diagram, which may be employed with aspects of the invention described herein.

As shown in FIG. 14, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 15:
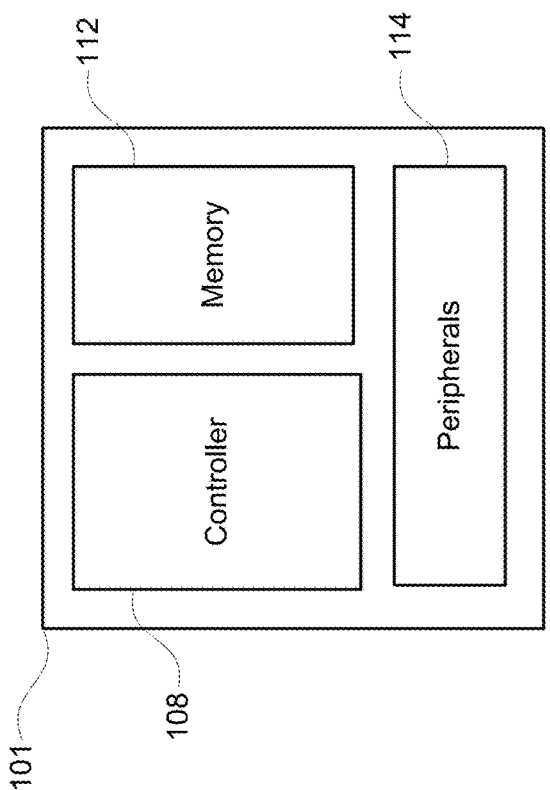
FIG. 15 illustrates an application processor subsystem for a wireless mobile station, which may be employed with aspects of the invention described herein.
Figure 16:
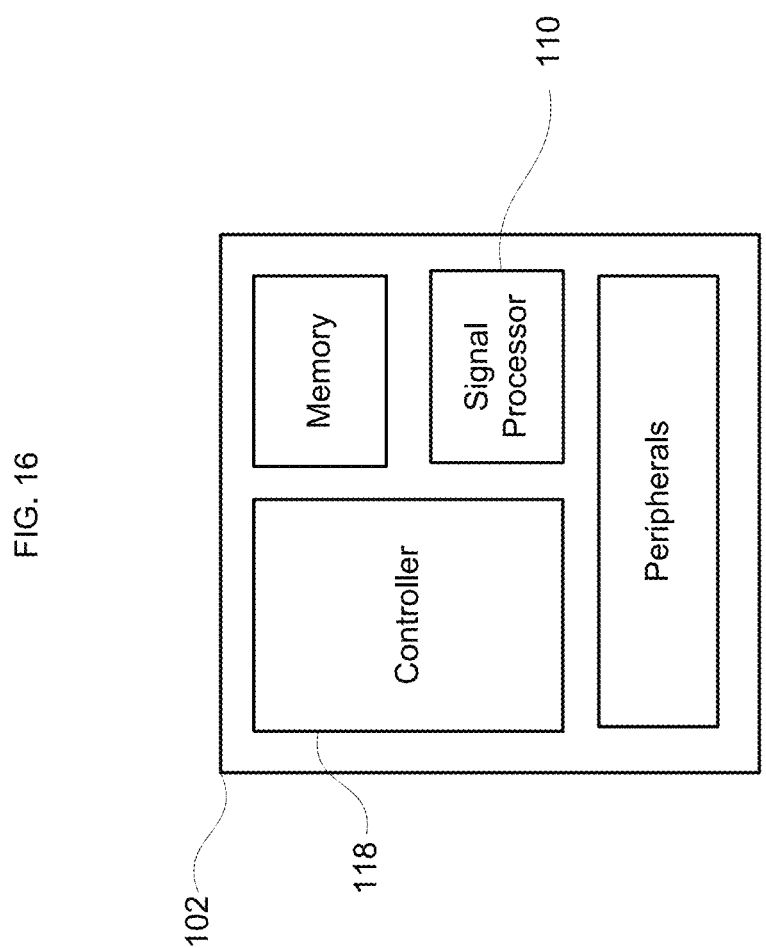
FIG. 16 illustrates a baseband subsystem for a wireless mobile station, which may be employed with aspects of the invention described herein.

The application processor subsystem 101 as shown in FIG. 15 may include a controller 108 such as a microcontroller or other processor. The baseband subsystem 102 as shown in FIG. 16 may include a controller 118 such as a microcontroller or other processor. The RF subsystem 104 as shown in FIG. 17 may include a controller 128 such as a microcontroller or other processor. The controller 108 desirably handles overall operation of the MS 100. This may be done by software or firmware running on the controller 108. Such software/firmware may embody any methods in accordance with the aspects of the present invention.

In FIG. 16 the peripherals 114 such as a full or partial keyboard, video or still image display, audio interface, etc may be employed and managed through the controller 108.

Aspects of the present invention may be implemented in firmware of the controller 108 of the application processor and/or the controller 118 of the baseband subsystem as shown in FIG. 14. In another alternative, aspects of the present invention may also be implemented as a combination of firmware and hardware of the application processor subsystem 101 and/or the baseband subsystem 102. For instance, signal processing functionality of any or all of the FIG. 16 may be implemented in firmware and/or software, which is executed by the system hardware. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The various aspects of the invention described herein provide a new and more efficient method of processing for wireless client terminals. And this may lead to improved performance of such portable communication devices in cellular communications systems.

The consumer electronics devices that may use this invention may include smartphones, tablets, laptops, gaming consoles, cameras, video camcorders, TV, car entertainment systems, etc.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

The invention claimed is:

1. A method for broadcast channel decoding of Physical Broadcast Channel (PBCH) at a client terminal, wherein the PBCH is formed from sets of a plurality of a predetermined radio frames and each of the sets has a Transmission Time Interval (TTI) and each of the radio frames is composed of a Master Information Block (MIB) payload and Cyclic Redundancy Check (CRC) and includes a same predetermined number of fixed coded bits, the method comprising:

controlling, by a processing device at the client terminal, combining the predetermined number of fixed coded bits for a predetermined number of the radio frames across a plurality of different TTIs, wherein the combining is performed at least one of (i) before applying scrambling based on a scrambling phase as per a radio frame offset within a given TTI, (ii) for all radio frame offsets within a predetermined number of TTIs, or (iii) after applying the scrambling based on the scrambling phase as per the radio frame offset within the given TTI;

controlling, by the processing device, the channel decoding of the PBCH by performing tail-biting convolutional coding (TBCC) on a K=40 bit input block of bits of the MIB payload and CRC of a given radio frame, in which the MIB payload includes a DL Bandwidth (DL BW) field 3 bits in width, a Physical Hybrid Automatic Repeat Request (HARQ) Indicator Channel (PHICH) Configuration 3 bits in width, a System Frame Number (SFN) field eight bits in width and a spare field 10 bits in width, and in which the TBCC is by L−1 shift registers initialized with a last L−1 bits of the 40 bit input block, in which L is a predetermined constraint length, in which decoding of an output corresponding to a seventh input bit is performed using a known state of the shift registers at that time; and controlling, by the processing device, starting Viterbi decoding with a second known state based on known first six bits of the PBCH payload and starting the decoding from output bits corresponding to the seventh input bit, continuing the decoding through a buffer associated with the decoding to wrap around to a sixth input bit such that a final state is same as a known initial state.

2. The method of claim 1, further comprising:
controlling, by the processing device, during the decoding, pruning each path known to be invalid.

3. An apparatus for broadcast channel decoding of Physical Broadcast Channel (PBCH) at a client terminal, wherein the PBCH is formed from sets of a plurality of a predetermined radio frames and each of the sets has a Transmission Time Interval (TTI) and each of the radio frames is composed of a Master Information Block (MIB) payload and Cyclic Redundancy Check (CRC) and includes a same predetermined number of fixed coded bits, the apparatus comprising:

circuitry configured to control, at the client terminal, combining the predetermined number of fixed coded bits for a predetermined number of the radio frames across a plurality of different TTIs, wherein the combining is performed at least one of (i) before applying scrambling based on a scrambling phase as per a radio frame offset within a given TTI, (ii) for all radio frame offsets within a predetermined number of TTIs, or (iii) after applying the scrambling based on the scrambling phase as per the radio frame offset within the given TTI, wherein the circuitry is configured to control the channel decoding of the PBCH by performing tail-biting convolutional coding (TBCC) on a K=40 bit input block of bits of the MIB payload and CRC of a given radio frame, in which the MIB payload includes a DL Bandwidth (DL BW) field 3 bits in width, a Physical Hybrid Automatic Repeat Request (HARQ) Indicator Channel (PHICH) Configuration 3 bits in width, a System Frame Number (SFN) field eight bits in width and a spare field 10 bits in width, and in which the TBCC is by L−1 shift registers initialized with a last L−1 bits of the 40 bit input block, in which L is a predetermined constraint length, in which decoding of an output corresponding to a seventh input bit is performed using a known state of the shift registers at that time, and wherein the circuitry is configured to control starting Viterbi decoding with a second known state based on known first six bits of the PBCH payload and starting the decoding from output bits corresponding to the seventh input bit, continuing the decoding through a buffer associated with the decoding to wrap around to a sixth input bit such that a final state is same as a known initial state.

4. The method of claim 3,
wherein the circuitry is configured to control, during the decoding, pruning each path known to be invalid.

* * * * *